(12) United States Patent
Pandit et al.

(10) Patent No.: US 10,051,053 B2
(45) Date of Patent: Aug. 14, 2018

(54) SYSTEM AND METHOD FOR TRANSFERRING AND SYNCHRONIZING CONTENT BETWEEN ELECTRONIC DEVICES

(71) Applicant: RELIANCE JIO INFOCOMM LIMITED, Mumbai (IN)

(72) Inventors: Vijeth Pandit, Bangalore (IN); Sumir Bharati, Thane (IN); Pratap Singh, London (GB); Nagappan Arunachalam, Palo Alto, CA (US)

(73) Assignee: RELIANCE JIO INFOCOMM LIMITED, Mumbai, Maharashtra (IN)

(*) Notice: Subject to any disclaimer, the term of this patent is extended or adjusted under 35 U.S.C. 154(b) by 313 days.

(21) Appl. No.: 14/747,841

(22) Filed: Jun. 23, 2015

(65) Prior Publication Data

US 2015/0381721 A1 Dec. 31, 2015

Related U.S. Application Data

(60) Provisional application No. 62/017,180, filed on Jun. 25, 2014.

(51) Int. Cl.
*H04L 29/08* (2006.01)
(52) U.S. Cl.
CPC .................. *H04L 67/1095* (2013.01)
(58) Field of Classification Search
CPC .................................................. H04L 67/1095
See application file for complete search history.

(56) References Cited

U.S. PATENT DOCUMENTS

| 8,788,944 | B1 * | 7/2014 | Gill ........................... G06F 8/61 |
| | | | 715/744 |
| 9,319,529 | B2 * | 4/2016 | Tregenza Dancer ... H04M 5/08 |
| 2004/0025143 | A1 * | 2/2004 | Bhogal ..................... G06F 8/75 |
| | | | 717/115 |
| 2008/0127037 | A1 * | 5/2008 | Kadur ....................... G06F 8/20 |
| | | | 717/100 |
| 2010/0081509 | A1 * | 4/2010 | Burke ................... G07F 17/323 |
| | | | 463/42 |
| 2010/0233996 | A1 * | 9/2010 | Herz ....................... H04L 63/08 |
| | | | 455/411 |
| 2011/0035455 | A1 * | 2/2011 | Sharma .............. G06Q 30/0207 |
| | | | 709/206 |
| 2011/0300834 | A1 * | 12/2011 | Ni .......................... G06Q 30/02 |
| | | | 455/414.1 |
| 2012/0117558 | A1 * | 5/2012 | Futty ................... G06F 9/44505 |
| | | | 717/176 |
| 2012/0191844 | A1 * | 7/2012 | Boyns .................... G06Q 30/02 |
| | | | 709/224 |

(Continued)

FOREIGN PATENT DOCUMENTS

JP 2007272305 A * 10/2007
JP 2011215825 A * 10/2011

*Primary Examiner* — Kostas Katsikis
(74) *Attorney, Agent, or Firm* — Ladas & Parry, LLP

(57) ABSTRACT

The embodiments of the present invention disclosed herein, include a transfer assistant module coupled to a number of electronic devices via communication channels. The content on the first device is transmitted to the transfer assistant module. The transfer assistant module facilitates transfer and synchronization of content to the second electronic device.

10 Claims, 6 Drawing Sheets

(56) References Cited

U.S. PATENT DOCUMENTS

| | | | |
|---|---|---|---|
| 2013/0205219 A1* | 8/2013 | Moha | G06F 3/04842 |
| | | | 715/748 |
| 2014/0059530 A1* | 2/2014 | Banavalikar | G06F 9/4406 |
| | | | 717/170 |
| 2014/0379811 A1* | 12/2014 | Chan | G06F 21/00 |
| | | | 709/205 |
| 2015/0032889 A1* | 1/2015 | Chan | H04L 67/1095 |
| | | | 709/224 |
| 2015/0381721 A1* | 12/2015 | Pandit | H04L 67/1095 |
| | | | 709/217 |

* cited by examiner

SYSTEM AND METHOD FOR TRANSFERRING AND SYNCHRONIZING CONTENT BETWEEN ELECTRONIC DEVICES

CROSS-REFERENCE TO RELATED APPLICATION(S)

This application claims the benefit of U.S. Provisional Application No. 62/017,180, filed on Jun. 25, 2014 in the United States Patent and Trademark Office, the disclosure of which is incorporated in its entirety herein by reference.

BACKGROUND

Field of the Invention

The present disclosure relates generally to electronic devices, and more specifically to systems and methods for synchronization and transfer of content between electronic devices.

Description of Related Art

The following description of related art is intended to provide background information pertaining to the field of the invention. This section may include certain aspects of the art that may be related to various aspects of the present disclosure. However, it should be appreciated that this section be used only to enhance the understanding of the reader with respect to the present disclosure, and not as admissions of prior art.

In recent years, use of consumer electronic devices has immensely increased. Many consumer electronic devices such as mobile devices, smart phones, personal digital assistants, laptops, tablets, etc. are widely used for both personal and business purposes. The extensive use of electronic devices has resulted in an increased need to transfer content stored on one electronic device to another electronic device. For instance, when a user wants to switch or upgrade from an old electronic device to a new electronic device, the user may want to transfer some or all of content stored on the old device to the new device.

Different electronic devices use different formats for storing content. Existing systems and transfer methods do not efficiently and automatically convert the data to be transmitted into desired format. Further, in some of the known transfer methods and systems, the user is required to give instructions to the system to convert data from one format to another. Furthermore, when content is to be transferred between devices that operate on different operating systems, some content cannot be transferred because it is not compatible with the operating system of the new device. The user has to search for similar applications that are compatible with the operating system of the new device. In this process, the user may not be able to find the best available option.

Thus, in light of the above problems, there is a need for developing a user friendly, easy to use system and method for facilitating transfer of content from one electronic device to another.

SUMMARY

The present disclosure provides an efficient system and method for transferring and synchronizing content between electronic devices. A method for transferring and synchronizing a set of content between a first electronic device and a second electronic device is disclosed. The method includes establishing a connection based on an access point between the first electronic device, the second electronic device and a transfer assistant module. The method further includes determining from the set of content, a subset of unsupported content and a subset of content supported by the second electronic device. Next, the method provides a set of recommendation content based on the subset of unsupported content. The set of recommendation content comprises content analogous to the subset of unsupported content. Subsequently, the subset of supported content and the set of analogous content are transmitted from the first electronic device to the second electronic device.

A system for transferring and synchronizing a set of content between a first electronic device and a second electronic device includes a memory comprising a data repository and a processor configured to determine from the set of content, a subset of unsupported content and a subset of content supported by the second electronic device. The system further includes a recommendation module configured to provide a set of recommendation content based on the subset of unsupported content. The set of recommendation content provided by the recommendation module comprises a set of content analogous to the unsupported content. The system further includes a transceiver module configured to transmit the subset of supported content and the set of analogous content to the second electronic device.

BRIEF DESCRIPTION OF THE DRAWINGS

The accompanying drawings, which are incorporated in, and constitute a part of this disclosure, illustrate exemplary embodiments of the invention in which like reference numerals refer to the same parts throughout the different drawings. Components in the drawings are not necessarily to scale, emphasis instead being placed upon clearly illustrating the principles of the present disclosure.

Figure 1:
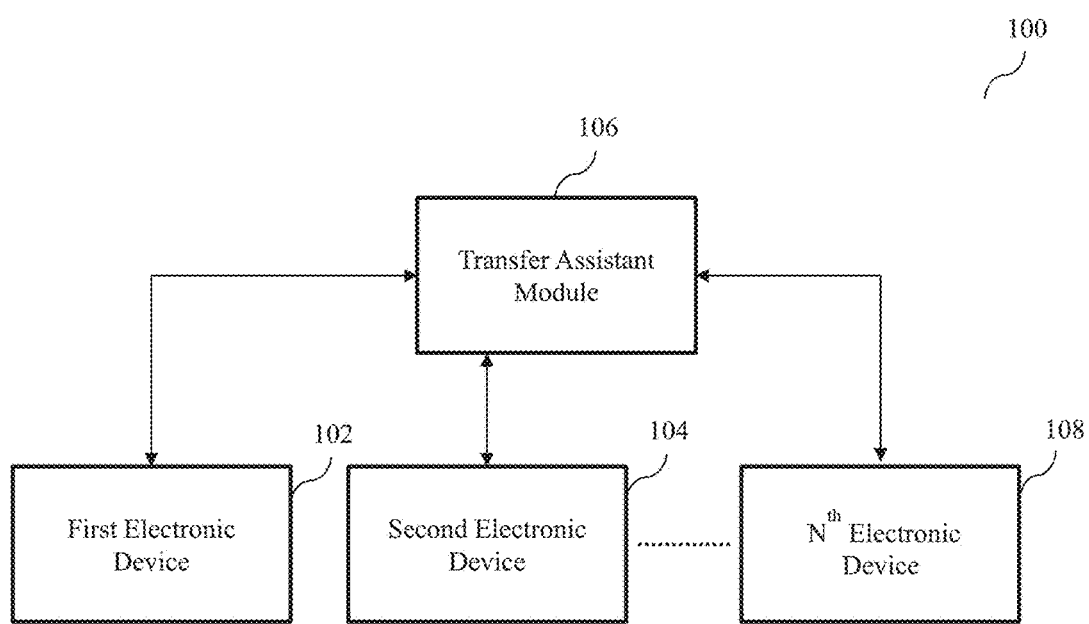
FIG. 1 illustrates a system for transferring and synchronizing content, according to an exemplary embodiment of the present invention.

The foregoing will be apparent from the following more detailed description of example embodiments of the invention, as illustrated in the accompanying drawings.

DETAILED DESCRIPTION

In the following description, for the purposes of explanation, various specific details are set forth in order to provide a thorough understanding of the present invention. It will be apparent, however, that the present invention may be practiced without these specific details. Several features described hereafter can each be used independently of one another or with any combination of other features. However, any individual feature may not address any of the problems discussed above or might address only some of the problems discussed above. Some of the problems discussed above might not be fully addressed by any of the features described herein. Although headings are provided, information related to a particular heading, but not found in the section having that heading, may also be found elsewhere in the specification. Further, information provided under a particular heading may not necessarily be a part of only the section having that heading.

As used herein, "hardware" includes a combination of discrete components, an integrated circuit, an application specific integrated circuit, a field programmable gate array, other programmable logic devices and/or other suitable hardware as may be obvious to a person skilled in the art.

As used herein, "software" includes one or more objects, agents, threads, lines of code, subroutines, separate software applications, or other suitable software structures as may be obvious to a skilled person. In one embodiment, software can include one or more lines of code or other suitable software structures operating in a general purpose software application, such as an operating system, and one or more lines of code or other suitable software structures operating in a specific purpose software application.

As used herein, "couple" and its cognate terms, such as "couples" and "coupled" includes a physical connection (such as a conductor), a virtual connection (such as through randomly assigned memory locations of data memory device), a logical connection (such as through logical gates of semiconducting device), other suitable connections, or a combination of such connections, as may be obvious to a skilled person.

As used herein, a "network" and "communication network" refers to a medium that interconnects various computing devices. A network includes, but is not limited to, personal area network, local area network, metropolitan area network, wide area network, Internet, or any combination thereof. A network may be a storage area network, virtual private network, enterprise private network or a combination thereof.

As used herein, a "processor" refers to any logic circuitry for processing instructions. A processor may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), etc. The processor may perform signal coding, data processing, power control, input/output processing, and/or any other functionality that enables the working of the system according to the present invention.

As used herein, a "memory" refers to any non-transitory media that stores data and/or instructions that cause a machine to operate in a specific manner. The invention encompasses a memory, wherein the memory includes a volatile memory or a non-volatile memory. Non-volatile memory includes, for example, a storage device such as magnetic disk, optical disk, solid state drives, or any other storage device for storing information and instructions. Volatile memory includes, for example, a dynamic memory. The invention further encompasses a memory, wherein the memory is single or multiple, coupled or independent, is positioned at device level or server level and encompasses other variations and options of implementation as may be obvious to a person skilled in the art.

As used herein, a "communication bus" or a "bus" includes hardware, software and communication protocol used by the bus to facilitate transfer of data and/or instructions.

As used herein, a "native application" refers to any application software that is pre-installed, or downloaded and installed, in an electronic device. Native applications include, but is not limited to, contact management application, calendar application, messaging applications, image and/or video modification and viewing applications, gaming applications, navigational applications, office applications, business applications, educational applications, health and fitness applications, medical applications, financial applications, social networking applications, and any other applications.

As used herein, "native data" refers to data created, modified or installed in an electronic device over time. Native data includes, but is not limited to, contacts, calendar entries, call logs, SMS, images, videos, factory data, and data associated with one or more native applications.

As used herein, "content" refers to data and software stored or contained in an electronic device. Content includes native data and native applications stored or contained in an electronic device. Content may further include any content downloaded and/or installed from a third party database. Content may be in the form of packets, bits, messages, or any other communication element. Transfer or transmission of content includes transfer or transmission of packets, messages, bits, or any other communication element.

As used herein, a "set" refers to a collection of distinct content. A set may refer to a set of one or more content. A set may also refer to a null set i.e. a set that does not contain any content. Content in a set may be related or unrelated to other content in the same set.

As used herein, a "subset" of any set refers to a portion of that set. All content contained in the subset of a set is also contained in that set. A subset may refer to a subset of one or more content. A subset may also refer to a null subset i.e. a subset that does not contain any content. Content in a subset may be related or unrelated to other content in that subset.

General Overview

A system and method for synchronizing and transferring content between electronic devices is described. A method for synchronizing content between a first electronic device and a second electronic device in accordance with the present invention includes the following steps.

A connection is established based on an access point, between a first electronic device, a second electronic device and a transfer assistant module. As used herein, "first electronic device" and "second electronic device" refers to any electrical, electronic, electromechanical and computing device or equipment. In one embodiment of the present invention, the first electronic device and the second electronic device are mobile devices communicating via a communication network. Electronic devices may include, but not limited to, a mobile phone, smart phone, pager, laptop, a general purpose computer, desktop, personal digital assistant, tablet computer, mainframe computer, or any other computing device as may be obvious to a person skilled in the art.

Subsequently, from the set of content, a subset of unsupported content and a subset of content supported by the second electronic device are determined. As used herein, "unsupported content" refers to content in the first electronic device that is not reconcilable with the second electronic device. Some modification may be required in the unsupported content in order to be viewed, stored and/or used in the second electronic device.

Subsequently, a set of recommendation content is provided based on the subset of unsupported content. The set of recommendation content comprises a set of content analogous to the unsupported content. As used herein, "recommendation content" includes modified native data, modified native application data and analogous content. As used herein, "analogous content" refers to content analogous to unsupported content, such that the analogous content is reconcilable with the second electronic device. The invention encompasses analogous content that comprises features that are same or substantially similar to the features of the unsupported content. The invention further encompasses analogous content that comprises features related to that of the unsupported content.

Next, the subset of supported content and set of analogous content are transmitted from the transfer assistant device to the second electronic device.

As used herein, "transfer", "transmit", "synchronize" and their cognate terms like "transferring", "transmitting", "synchronizing", "synchronization", etc. include moving or transporting content from one device or module to another device or module, wherein the content may or may not be modified before or after transferring, transmitting or synchronizing. Transferring, transmitting or synchronizing content may specifically include moving or transporting content from first electronic device to second electronic device.

System Overview

FIG. 1 illustrates example architecture of a system for transferring and synchronizing content between a first electronic device and a second electronic device, according to the present invention.

As shown in FIG. 1, the system 100 comprises a transfer assistant module 106 connected to a first electronic device 102, a second electronic device 104, nth electronic device 108 via one or more communication channels 110. Although only three electronic devices have been shown in FIG. 1, it will be appreciated by those skilled in the art that the disclosed embodiments contemplate any number of electronic devices connected to the transfer assistant module 106.

The first electronic device 102 is configured to transmit a set of content to the transfer assistant module 106. The transfer assistant module 106 is configured to determine from a set of content, a subset of unsupported content and subset of content supported by the second electronic device 104. The transfer assistant module 106 is further configured to provide a set of recommendation content based on the subset of unsupported content, wherein the set of recommendation content comprises a set of analogous content. The second electronic device 104 is configured to receive the subset of supported content and the set of recommendation content from the transfer assistant module 106.

The invention encompasses a system 100 wherein the first electronic device 102 and the second electronic device 104 are same or similar electronic devices. For instance, a system 100 wherein both the first electronic device 102 and the second electronic device 104 are mobile phones. The invention further encompasses a system 100 wherein the first electronic device 102 is different from the second electronic device 104. For instance, a system 100 wherein the first electronic device 102 is a mobile phone and the second electronic device 104 is a laptop. The invention further encompasses a system 100 wherein the first electronic device 102 and the second electronic device 104 operate on same or different operating systems.

The invention encompasses a system 100 configured to transfer and synchronize a set of content between two or more electronic devices. The invention further encompasses a system 100 configured to transfer and synchronize a set of content between one or more pairs of electronic devices simultaneously. The invention further encompasses a system 100 configured to transfer and synchronize a set of content from one electronic device to multiple electronic devices simultaneously.

The invention encompasses a system 100 for transferring and synchronizing a set of content between electronic devices, wherein one or more electronic devices are connected to the transfer assistant module 106 via a communication network. The invention further encompasses a system 100 for transferring and synchronizing a set of content between electronic devices, wherein the transfer assistant module 106 is present in one of the electronic devices.

Figure 2:
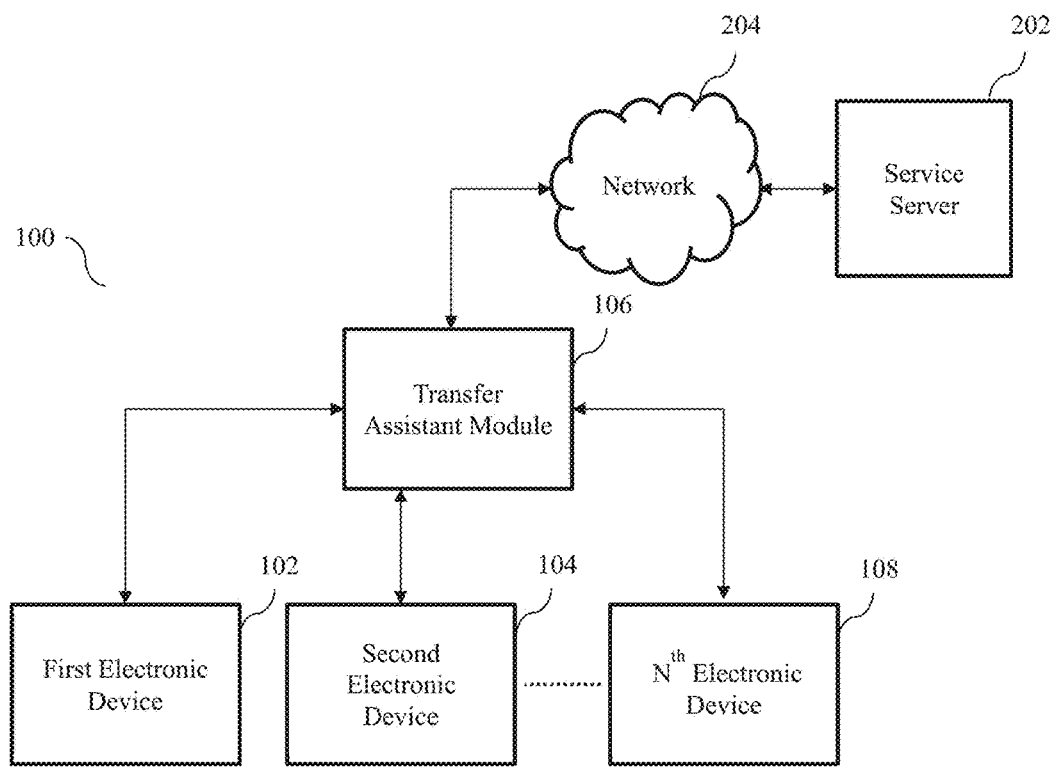
FIG. 2 illustrates a system for transferring and synchronizing content, the system connected to a service server, according to an exemplary embodiment of the present invention.

FIG. 2 illustrates a system for transferring and synchronizing content, the system connected to a service server, according to an exemplary embodiment of the present invention.

As shown in FIG. 2, the system 100 comprises a transfer assistant module 106 connected to a first electronic device 102, a second electronic device 104, nth electronic device 108 via one or more communication channels 110, wherein the transfer assistant module 106 is connected to an external service server 202. The invention encompasses a system 100, wherein the transfer assistant module 106 is connected to an external service server 202 via a communication network 204. The invention further encompasses a system 100, wherein the communication network 204 comprises one or more networks.

First Electronic Device

Figure 3:
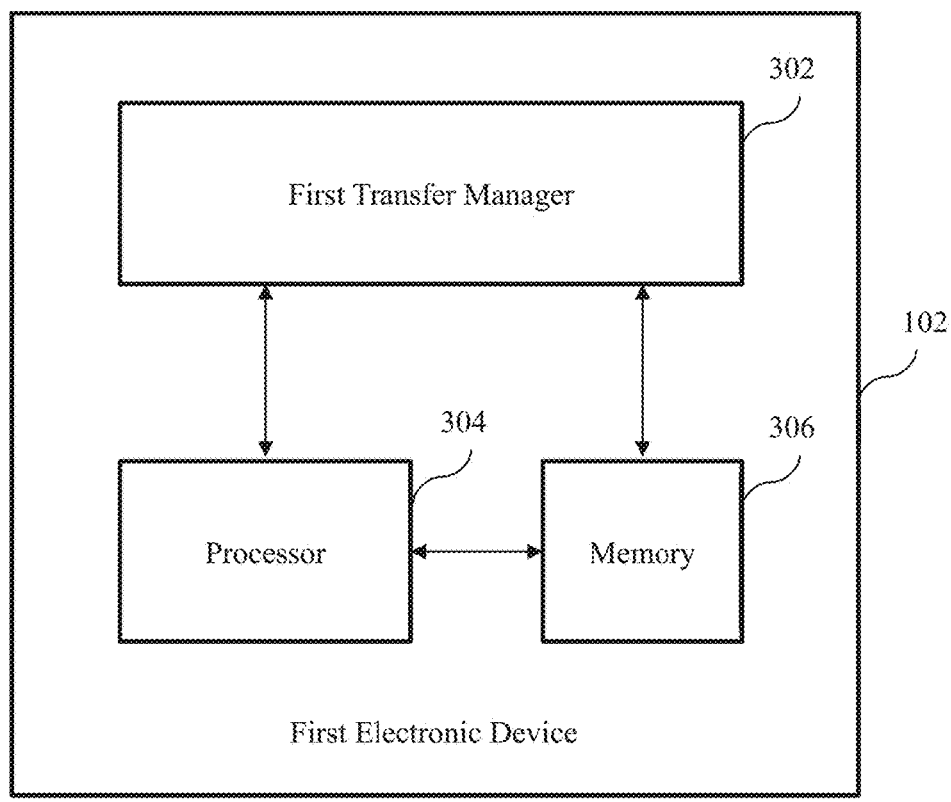
FIG. 3 illustrates a first electronic device according to an exemplary embodiment of the present invention.

FIG. 3 illustrates example architecture of a first electronic device 102. The first electronic device 102 is configured to transmit a set of content to the second electronic device 104.

As shown in FIG. 3, the first electronic device 102 comprises a first transfer manager 302, a processor 304 and a memory 306. The memory 306 is configured to store some or all content present in the first electronic device 102. Content present in the first electronic device 102 includes, but is not limited to, native data and native applications.

The processor 304 is configured to fetch a set of content from the memory 306 and provide the same to the first transfer manager 302. The invention encompasses a first electronic device 102, wherein the processor 304 is configured to process and/or modify the set of content fetched from the memory 306 before providing the same to the first transfer manager 302. The invention also encompasses a first transfer manager 302 configured to fetch a set of content directly from the memory 306. The first transfer manager 302 is configured to transmit the content received from the processor 304 and/or memory 306 of the first electronic device 102 to the transfer assistant module 106.

The invention encompasses a first electronic device 102, wherein the first electronic device 102 further comprises a communication interface (not shown in FIG. 3) adapted to facilitate input and/or output on the first electronic device 102. The communication interface of the first electronic device 102 may be connected to the first transfer manager 302 and the processor 304.

Second Electronic Device

Figure 4:
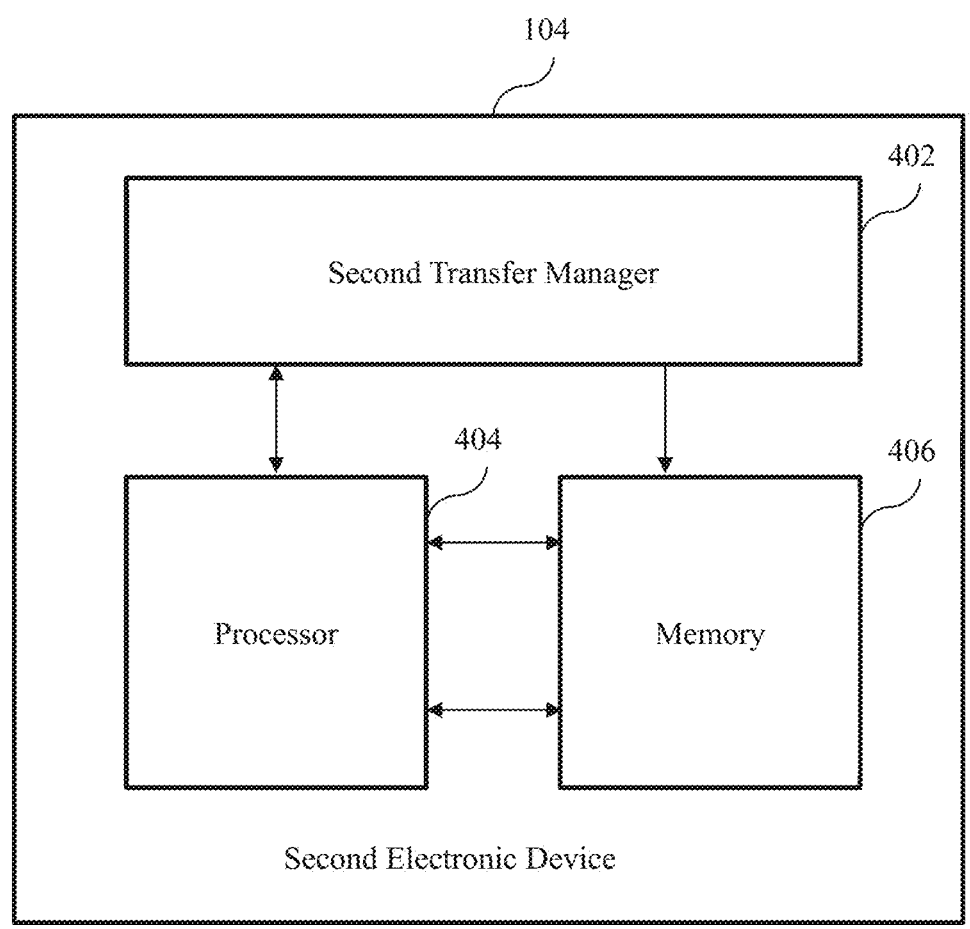
FIG. 4 illustrates a second electronic device according to an exemplary embodiment of the present invention.

FIG. 4 illustrates example architecture of a second electronic device 104. The second electronic device 104 is configured to receive content from the transfer assistant module 106.

As shown in FIG. 4, the second electronic device 104 comprises a second transfer manager 402, a processor 404 and a memory 406. The second transfer manager 402 is configured to receive content from the transfer assistant module 106 and provide the same to the processor 404 and/or memory 406. The memory 406 is configured to store content received from the second transfer manager 402 and/or the processor 404, and all content already present in the second electronic device 104. Content already present on the second electronic device includes, but is not limited to, native data and native applications. Content received from the second transfer manager 402 includes, but is not limited to, transferred data and transferred applications.

The processor 404 is configured to receive and/or retrieve content from the second transfer manager 402 and provide the same to the memory 406. The invention encompasses a second electronic device 104 comprising a processor 404, wherein the processor 404 is configured to process and or/modify the content received from the second transfer manager 402 before providing the same to the memory 406.

Transfer Assistant Module

Figure 5:
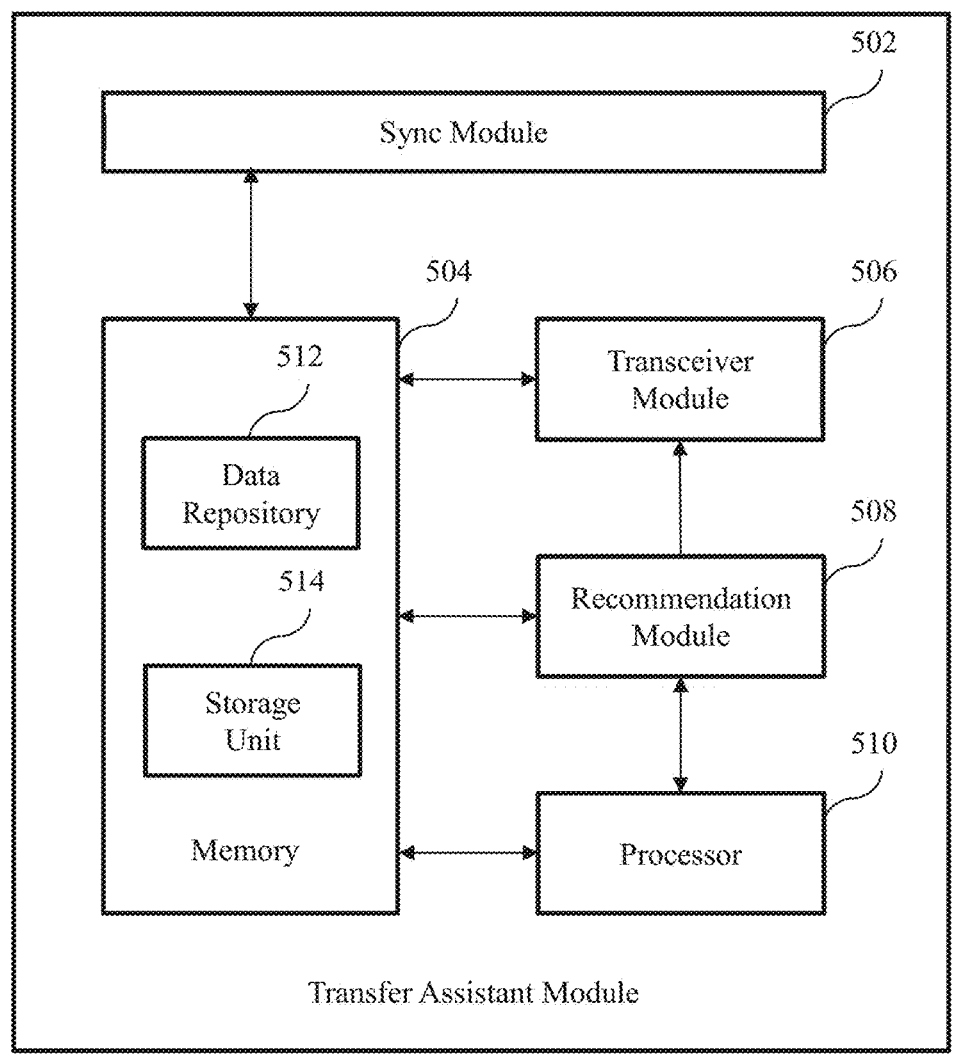
FIG. 5 illustrates a transfer assistant device according to an exemplary embodiment of the present invention.

FIG. 5 illustrates example architecture of the transfer assistant module 106. The transfer assistant module 106 is configured to receive a set of content from the first electronic device 102 and provide a subset of supported content and set of recommended content to the second electronic device 104. The transfer assistant module 106 is adapted to be connected to an external service server 202.

The invention encompasses a transfer assistant module 106 stored in the first electronic device 102 or the second electronic device 104. The invention further encompasses a transfer assistant module 106 stored in a standalone device such as a set top box, etc. The invention also encompasses a transfer assistant module 106 implemented partially in any of the electronic devices in the system 100 and partially in a standalone device.

As shown in FIG. 5, the transfer assistant module 106 comprises a sync module 502, a memory 504, a transceiver module 506, a recommendation module 508 and a processor 510. The memory 504 comprises at least one data repository 512 and a storage unit 514. The data repository 512 is configured to store content synchronized from the external service server 202. The storage unit 514 is configured to store a set of content received from the first transfer manager 302. The invention encompasses a transfer assistant module 106 comprising a storage unit 512, wherein the storage unit 512 is also configured to store a subset of unsupported content and a subset of content supported by the second electronic device 104. The invention encompasses a memory 504 comprising a data repository 512 and a storage unit 514, wherein the data repository 512 and the storage unit 514 include one or more databases, lookup tables, or any other form of collecting and/or organizing content, as may be obvious to a skilled person.

The memory 504 is configured to store additional information. Additional information includes, but is not limited to, meta-information about the content, synchronized form the external service server 202, last synchronization status, last synchronization time, current online status, synchronization errors, store id of the external service server, firmware and/or software version information of the transfer assistant module, updates on firmware and software of the transfer assistant module, firmware and/or software version information of the external synchronization server, or any other information, that may be required for efficient transfer and synchronization of content in accordance with the present invention.

The transceiver module 506 is configured to receive a set of content from the first transfer manager 302 and provide the same to the storage unit 512. The transceiver module 506 is further configured to receive a set of recommendation content from the recommendation module 508 and provide the same to the first transfer manager 302 and/or the second transfer manager 402.

The processor 510 is configured to process the set of content received from the first transfer manager 302 and stored in the storage unit 512, to generate subset of unsupported content and subset of content supported by the second electronic device 104. The processor 510 is further configured to provide the subsets of supported and unsupported content to the storage unit 512. The processor 510 is also configured to process requests sent by the sync module 502 and one or more electronic devices. The processor 510 is further configured to provide processing for one or more methods for transfer and synchronization of content, as described herein.

The sync module 502 is configured to connect with the external service server 202 and synchronize content from the external service server 202 to the transfer assistant module 106. The invention encompasses a sync module 502 configured to connect with the external service server 202 via one or more networks 204. The invention encompasses a sync module 502 that is configured to synchronize content from the external service server 202 periodically. In a preferred embodiment, the sync module 502 is configured to synchronize content from the external service server 202 every one hour. Content synchronized between the external service server 202 and the transfer assistant module 106 includes, but is not limited to, mobile applications, application software, offers, campaigns, recommendations, advertisements, and any other content as described herein, or that may be obvious to a skilled person.

The invention encompasses a sync module 502 configured to authenticate the external service server 202 before synchronizing content from the external service server 202. Authenticating the external service server 202 may comprise sending a connection request packet to the external service server 202 using its network address, wherein the connection request packet contains a request for retrieving an identifier of the server 202. After receiving the identifier of the server 202, content is synchronized into the transfer assistant module 106.

The sync module 502 is configured to provide the content synchronized from the external service server 202 to the memory. The invention encompasses a sync module 502 that is further configured to upload transfer logs stored in the transfer assistant module 106 to the server 202. The transfer logs includes content that has been previously synchronized from the external service server 202 to the transfer assistant module 106.

The invention encompasses a transfer assistant module 106 comprising a sync module 502, wherein the sync module 502 further comprises a communication interface (not shown in FIG. 5). The communication interface is configured to facilitate communication between the sync module 502 and the external service server 202.

The recommendation module 508 is configured to generate recommendation content based on the subset of unsupported content stored in the data repository 512. The recommendation module 508 is further configured to generate recommendation content based on the subset of unsupported content and content supported by the second electronic device 104. The invention encompasses a recommendation module 508 that generates recommendation content, wherein the recommendation content is analogous to the unsupported content. The recommendation module 508 is further configured to store the recommendation content in the memory 504 and also, or alternatively, transmit the recommendation content to the transceiver module 506. The recommendation content includes, but is not limited to, analogous applications, formatted data, formatted applications, related applications, advertisements, offers and campaigns.

The invention includes generating a request to create analogous content for a subset of unsupported content if no recommendation content is found for said unsupported content. The invention further includes generating a request to create analogous content for a subset of unsupported content when recommendation content is found for said unsupported content but the user wishes to generate such a request.

The transfer assistant module 106 may further comprise a DNS server, a DHCP server and a Common Gateway Interface (not shown in FIG. 5). The DNS server provides names to electronic devices connected to the transfer assistant module 106. The DHCP server maintains a pool of IP addresses and provides a unique IP address to any electronic device that connects with the DHCP server in the transfer assistant module 106.

Method Overview

Figure 6:
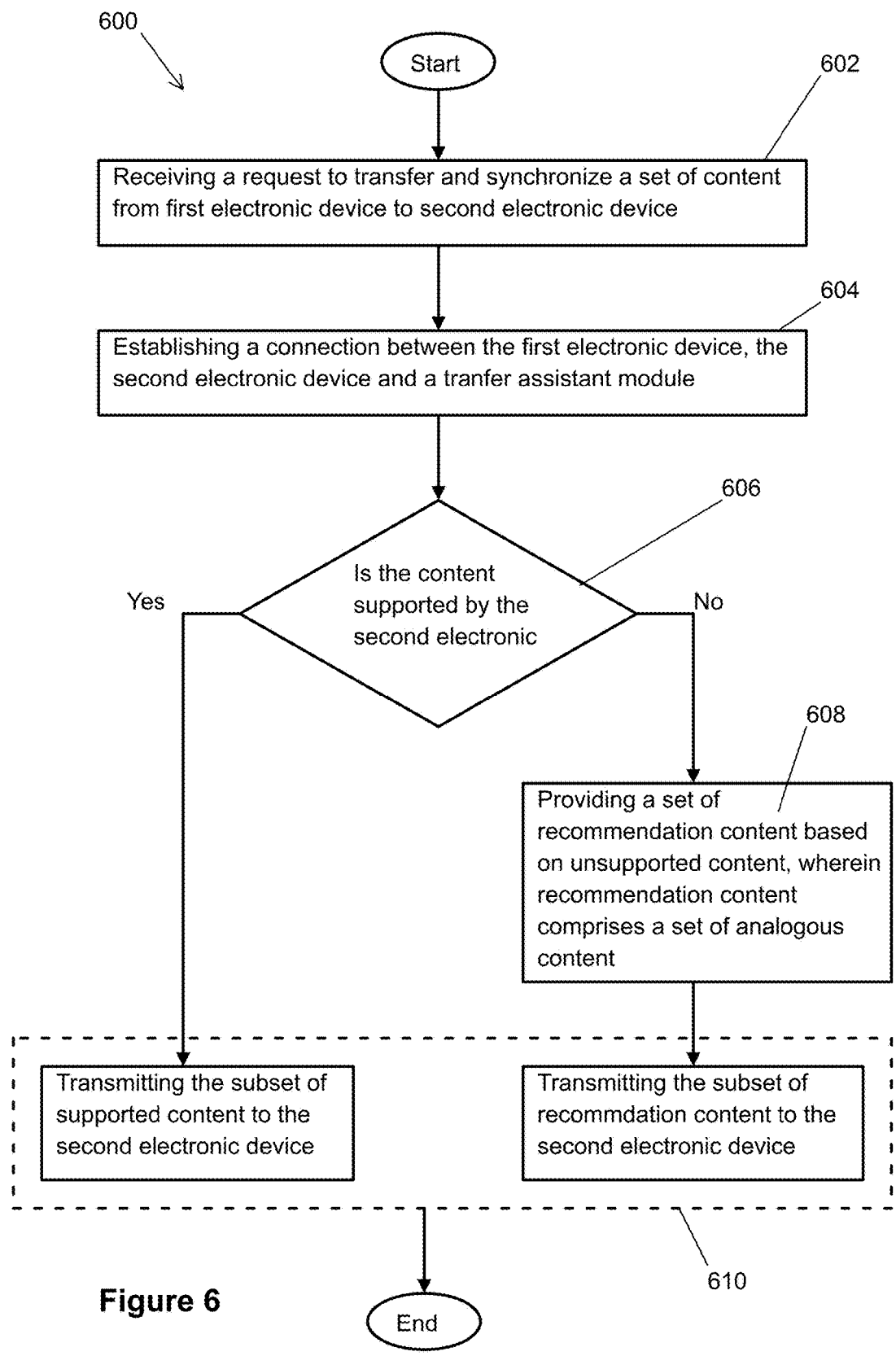
FIG. 6 illustrates a method for transferring and synchronizing content between electronic devices according to an exemplary embodiment of the present invention.

FIG. 6 illustrates example method of transferring and synchronizing content between a first electronic device and a second electronic device, according to the present invention.

At step 602, a request for transfer and synchronization of a set of content is received on the first electronic device 102. The invention encompasses receiving a request for transfer and synchronization of the set of content, wherein the request is made by the user via a user interface. A request is made by the user at the user interface, for example, by giving audio and/or video commands, touch commands, gestures, etc. The invention further encompasses providing a user control for selection of the set of content that is to be synchronized and/or transferred to the second electronic device 104. Providing a user control for selection of the set of content may include providing user selectable classes of content, such as contact, messages, call logs, notes, applications, etc.

At step 604, a connection is established between the first electronic device 102, the second electronic device 104 and the transfer assistant module 106 based on an access point. The invention encompasses establishing a connection between the first electronic device 102, the second electronic device 104 and the transfer assistant module 106 via a wired network, a wireless network or a combination thereof. The invention further encompasses establishing a connection based on a wireless access point. The invention also encompasses establishing a connection over Wi-Fi. The invention covers establishing a connection via Bluetooth. The invention also covers establishing a peer-to-peer connection between the first electronic device 102 and the second electronic device 104. The invention further covers establishing a connection between the first electronic device 102 and the second electronic device 104 through a hotspot created by the transfer assistant module 106.

The invention encompasses establishing a connection between the first electronic device 102, the second electronic device 104 and the transfer assistant module 106, wherein the establishing a connection comprises authenticating the first electronic device 102 and the second electronic device 104. Authentication of the first electronic device 102 and the second electronic device 104 may be provided by receiving same device identifier, such as an alphanumeric code, on both the devices. Alternatively, a picture pairing process may be used for authentication, wherein a set of pictures are generated on both devices and the devices are authenticated by selection of the same picture on both the first electronic device 102 and the second electronic device 104. It will be appreciated that the invention encompasses any known method for authenticating two devices as may be obvious to a skilled person.

The invention covers establishing a connection between the first electronic device 102, the second electronic device 104 and the transfer assistant module 106 in response to receiving a request for transfer and synchronization of content, on the first electronic device 102. The invention also covers establishing a connection between the first electronic device 102, the second electronic device 104 and the transfer assistant module 106 in response to installation of one or more application software on the first electronic device 102 and/or the second electronic device 104.

At step 606, the process determines if content is supported by the second electronic device 104. If it is determined that the content is supported, the control passes directly to step 610. However, if at step 606 it is determined that the content is not supported by the second electronic device, the control passes to step 608. The invention encompasses determining if content is supported by the second electronic device 104 by obtaining device characteristics of the second electronic device 104 and comparing one or more parameters of the set of content and/or the device characteristics of the first electronic device 102, with the device characteristics of the second device 104. The invention further encompasses determining if content is supported by the second electronic device 104 by comparing one or more parameters of the set of content and/or the device characteristics of the first electronic device 102 with a pre-configured set of characteristics.

The invention encompasses determining a subset of unsupported content and a subset of content supported by the second electronic device 104, wherein said subsets are determined by the first electronic device 102. The invention further encompasses transferring a set of content from the first electronic device 102 to the transfer assistant module 106 and subsequently determining subset of unsupported content and a subset of content supported by the second electronic device 104, wherein said subsets are determined by the transfer assistant module 106.

The invention encompasses determining a subset of unsupported content and a subset of content supported by the second electronic device 104, wherein this step occurs prior to or after establishing a connection between the first electronic device 102, the second electronic device 104 and the transfer assistant module 106. The invention encompasses determining a subset of unsupported content and a subset of content supported by the second electronic device 104, in response to receiving a request for transfer and synchronization of content between electronic devices.

At step 608, a set of recommendation content is provided based on the subset of unsupported content, wherein the set of recommendation content comprises content analogous to the subset of unsupported content. The invention encompasses providing the set of recommendation content based on a profile of a user of the first electronic device 102 and/or the second electronic device 104. The profile of a user of the first electronic device 102 and/or second electronic device 104 may be retrieved from the user profile information stored on the device. Alternatively, the profile of the user may be obtained from one or more social networking platforms, websites or applications. The invention further encompasses providing the set of recommendation content based on characteristics of the second electronic device 104. The characteristics of the second electronic device 104 are retrieved from the second electronic device 104 at any time after establishing a connection between the first electronic device 102, the second electronic device 104 and the transfer assistant module 106. The invention also encompasses providing set of recommendation content based on an activity of the user of the first electronic device 102 and/or the second electronic device 104. Activity of the user includes, but is not limited to, web browsing history of the user, navigational history of the user or any other activity as may be obvious to a skilled person.

The invention includes providing the set of recommendation content, wherein providing the set of recommendation content comprises identifying analogous content from the data repository 512. The invention further includes providing the set of recommendation content by identifying analogous content from a third-party data server. The invention further includes providing the set of recommendation content, wherein providing the set of recommendation content comprises modifying a format of the subset of unsupported content.

At step 610, the set of supported content and the set of recommendation content is transmitted from the first electronic device 102 to the second electronic device 104. The invention encompasses transmitting the subset of supported content and the set of recommendation content from the first electronic device 102 to the second electronic device 104 via the transfer assistant module 106. The invention encompasses unicast, multicast and broadcast transmission of the subset of supported content and set of recommendation content from the first electronic device 102. In case of multicast and broadcast transmission, content may be transmitted from a first electronic device 102 to more than one electronic device. The invention encompasses transmission of some or all content from the set of recommendation content provided by the system. The invention further encompasses transmission of the content selected by the user from the set of recommendation content.

The invention further includes displaying a list of transmitted content on the second electronic device 104 that allows the user to confirm that all selected and/or desired content has been transmitted. Displaying a list of transmitted content may further include displaying the number of items selected on the first electronic device 102 to be transmitted and a list of items that are transmitted from the first electronic device 102 to the second electronic device 104. The invention also includes displaying a list of desired and/or selected content to be transmitted that was not transmitted to the second electronic device 104 due to one or more errors. The invention also covers displaying the list of transmitted content, wherein the list of transmitted content includes a user control such as one or more hyperlinks, executable code, or any other code that initiates the download and/or installation of the transmitted content on the second electronic device 104. The invention encompasses providing user control for downloading and/or installing transmitted content, wherein the user control provides details or information about the transmitted content. The invention encompasses user control for downloading and/or installing transmitted content that allows the user to select one or more content and initiate download and/installation of all selected content with one user instruction.

The invention further encompasses a method for transferring and synchronizing content between the first electronic device 102 and the second electronic device 104, wherein the method comprises synchronizing the transfer assistant module 106 periodically with the service server 202. The invention also encompasses a method for transferring and synchronizing content between the first electronic device 102 and the second electronic device 104, wherein the method comprises displaying a user control for selecting the set of recommendation content. The user control may include one or more hyperlinks or other suitable controls that allows the user to install one or more content on the second electronic device 104. The invention encompasses displaying a user control for selecting the set of recommendation content, wherein the controls to duplicate content that is already present on the second electronic device 104 is deleted or skipped by the system 100.

In operation, the method as shown in FIG. 6 allows a user to transmit and synchronize content between a first electronic device 102 and a second electronic device 104. Although the method 600 has been shown as a flowchart in FIG. 6, it can also or alternatively be implemented as one or more objects, state diagrams, or any other suitable manner.

The present invention encompasses removing the set of content from the first electronic device 102 after it has been transmitted to the second electronic device 104. The invention includes providing a user control that allows the user to select content that is to be removed from the first electronic device 102 after the same has been transmitted to the second electronic device 104.

The present invention encompasses one or more error detection and correction mechanisms. Error may be connection establishment error, connection lost error, transmission error, packet lost error, packet damage error, address conflict error, path error, or any other errors encountered by the system 100. The error detection and correction mechanism may be systematic or non-systematic. The invention encompasses error detection and correction mechanism including adding one or more headers and/or trailers to one or more packets transmitted within, from or to the system 100. The invention encompasses use of error detection mechanisms such as repetition codes, parity bits, checksums, cyclic redundancy checks, hash functions, or any other mechanism or combination of mechanisms as may be obvious to a skilled person. The invention encompasses use of error correction mechanisms such as automatic repeat request (ARQ), forward error correction (FEC), or any other mechanism or combination of mechanisms as may be obvious to a skilled person.

Hardware Overview

The system for transferring and synchronizing content comprises of two or more electronic devices connected to a transfer assistant module via one or more communication channels. The invention encompasses electronic devices that are hard wired to perform the techniques as disclosed herein. Alternatively, the electronic devices include one or more application specific integrated circuits or field programmable gate arrays that are programmed to perform the techniques described herein. Techniques described herein may be performed by one or more devices and the transfer assistant module in response to execution of instructions by one or more processors, wherein the instructions are stored in one or more memory units.

The invention includes communication channels 110 which are wired channels or wireless channels. In a preferred embodiment, the communication channels 110 are based on Institute of Electrical and Electronics Engineers (IEEE) 802.11 standards. Wired communication channels include, for example, coaxial cables, copper wires, fiber optics, or any other wires as may be obvious to a person skilled in the art. Communication between modules or units within the electronic devices and the transfer assistant module 106 occur via a bus or other communication mechanisms as obvious to a person skilled in the art.

One or more electronic devices and the transfer assistant module 106 comprise a memory that may include a random access memory or other dynamic storage device for storing information and instructions to be executed by a processor. The memory in each device may be used for storing temporary variables or other intermediate information during execution of instructions by a processor. The memory in each electronic device and the transfer assistant module 106 may further include a read only memory or other static storage device for storing static information and instructions for a processor.

One or more electronic devices and the transfer assistant module 106 may be coupled to a display unit for displaying information to the user. The display unit may include different display technologies as may be obvious to a person skilled in the art, such as CRT display, a liquid crystal display (LCD), a electro luminescent display (ELD), a gas plasma display, etc.

One or more electronic devices and the transfer assistant module 106 may be coupled to an input unit for communicating information input by the user, to a processor or one or more other units in the electronic device or the transfer assistant module. The input unit may include alphanumeric and other keys. The input unit may additionally include a cursor control, such as a mouse, trackball, or cursor direction keys, for communicating direction information input by the user, to a processor or one or more other units in the electronic device or the transfer assistant module. The cursor control typically has two degrees of freedom, in two axes, a first axis (e.g. X axis) and a second axis (e.g. Y axis), that allows the cursor control to specify positions in a plane.

One or more electronic devices and the transfer assistant module 106 comprises of a communication interface that provides a two-way communication coupling to the external service server. The communication interface sends and received electrical, electromagnetic or optical signals that carry digital streams representing various types of information. The communication interface may be an integrated services digital network (ISDN) card, cable modem, satellite modem, or a modem to provide communication connection to a corresponding type of telephone line. The communication interface may further be a local area network (LAN) card to provide a communication connection to a compatible LAN.

The transfer assistant module may be connected to the external service server via one or more networks. Network may be a wired network, a wireless network or a combination thereof. The invention encompasses use of network, for example, internet, a personal area network, local area network, metropolitan area networks, wide area network, or any combination of these. In alternate embodiments, the network may even be a storage area network, a virtual private network or an enterprise private network.

We claim:

1. A method of transferring and synchronizing a set of content between a first electronic device and a second electronic device, the method comprising:
    establishing a connection based on an access point between the first electronic device, the second electronic device and a transfer assistant module;
    processing the set of content to generate a subset of unsupported content and a subset of content supported by the second electronic device;
    providing a set of recommendation content, said recommendation content including analogous content, wherein providing set of recommendation content further comprises:
        identifying analogous content from a data repository or from a third-party data server, and
        generating a request to create analogous content when recommendation content is not found;
    transmitting the subset of supported content and the set of recommendation content from the first electronic device to the second electronic device; and
    synchronizing the transfer assistant module periodically with a service server.

2. The method of claim 1 further comprising:
    selecting the subset of content supported by the second electronic device to be synchronized and/or transferred between the first electronic device and the second electronic device.

3. The method of claim 1, wherein establishing a connection based on an access point between the first electronic device, the second electronic device and the transfer assistant module comprises connecting via a wireless network, a wired network or a combination thereof.

4. The method of claim 1 further comprising:
    authenticating the first electronic device and the second electronic device.

5. The method of claim 1, wherein providing the set of recommendation content is based on a profile of a user of at least one of the first electronic device and the second electronic device.

6. The method of claim 1, wherein providing the set of recommendation content is based on characteristics of the second electronic device.

7. The method of claim 1, wherein providing the set of recommendation content comprises identifying the analogous content from at least one data repository.

8. The method of claim 1, wherein providing the set of recommendation content comprises modifying a format of the subset of unsupported content.

9. The method of claim 1 further comprises displaying a user control for selecting the set of recommendation content.

10. A system for transferring and synchronizing a set of content between a first electronic device and a second electronic device, the system comprising:
    a memory comprising a data repository; a processor configured to
    process the set of content to generate a subset of unsupported content and a subset of content supported by the second electronic device, wherein the system is configured to
        provide a set of recommendation content including analogous content, wherein
            analogous content for unsupported content is identified from a data repository or from a third-party data server,
    a request to create analogous content for unsupported content is generated, when recommendation content is not found; and
    a transceiver module configured to receive the recommendation content and transmit the subset of supported content and the set of recommendation content to the second electronic device, wherein the system is configured to synchronize the data repository periodically with a service server.

\* \* \* \* \*